United States Patent
Suman

(10) Patent No.: US 9,288,265 B2
(45) Date of Patent: Mar. 15, 2016

(54) SYSTEMS AND METHODS FOR PERFORMING MEMORY MANAGEMENT IN A DISTRIBUTED ENVIRONMENT

(71) Applicant: Wipro Limited, Bangalore (IN)

(72) Inventor: Abhishek Suman, Nalanda (IN)

(73) Assignee: Wlpro Limited, Bangalore (IN)

( * ) Notice: Subject to any disclaimer, the term of this patent is extended or adjusted under 35 U.S.C. 154(b) by 104 days.

(21) Appl. No.: 14/460,017

(22) Filed: Aug. 14, 2014

(65) Prior Publication Data
US 2015/0381728 A1  Dec. 31, 2015

(30) Foreign Application Priority Data
Jun. 26, 2014 (IN) .......................... 3107/CHE/2014

(51) Int. Cl.
G06F 11/00 (2006.01)
H04L 29/08 (2006.01)
H04L 12/927 (2013.01)

(52) U.S. Cl.
CPC .......... *H04L 67/1097* (2013.01); *H04L 47/803* (2013.01)

(58) Field of Classification Search
USPC .................................... 714/6.1, 2, 1
See application file for complete search history.

(56) References Cited

U.S. PATENT DOCUMENTS

| | | | |
|---|---|---|---|
| 2004/0039884 A1* | 2/2004 | Li ............................ | G06F 9/52 711/156 |
| 2012/0042060 A1* | 2/2012 | Jackowski et al. .. | H04L 47/2475 709/224 |

* cited by examiner

*Primary Examiner* — Sarai Butler
(74) *Attorney, Agent, or Firm* — LeClairRyan, a Professional Corporation

(57) ABSTRACT

Systems and methods for performing memory management among a plurality of devices in a network are described. In one implementation, the method for performing memory management comprises obtaining memory requirements for execution of an application. The memory requirements indicate memory space needed for executing the application. Further, the method comprises creating at least one memory pool, based on the memory requirements, by aggregating physical memories of the plurality of devices. Further, the method comprises executing the application in the at least one memory pool using semaphores and a mutex application programming interface (API).

15 Claims, 4 Drawing Sheets

SYSTEMS AND METHODS FOR PERFORMING MEMORY MANAGEMENT IN A DISTRIBUTED ENVIRONMENT

This application claims the benefit of Indian Patent Application No. 3107/CHE/2014 filed Jun. 26, 2014, which is hereby incorporated by reference in its entirety.

FIELD

The present subject matter relates to memory management, and, particularly but not exclusively, to memory management among multiple devices in a distributed environment.

BACKGROUND

Nowadays, huge amount of data is being generated with every passing minute. The huge amount of data leads to high processing and memory requirements so that various operations or tasks can be performed on the data. Currently, multiple servers or systems, which are interconnected with each other through a network, are used to process and store this huge amount of data. Typically, in such arrangement, when a task having high processing and memory requirements is to be executed, the task is split into multiple sub-tasks and these sub-tasks are assigned to the systems, available in a network, for execution. Thereafter, the systems execute the sub-tasks assigned to them and in this manner execution of the task is completed.

SUMMARY

Disclosed herein are systems and methods for performing memory management among a plurality of devices in a network. In one example, the apparatus or system that performs memory management, comprises a processor, a memory communicatively coupled to the processor, wherein the memory stores processor-executable instructions, which, on execution, cause the processor to obtain memory requirements for execution of an application. The memory requirements indicate memory space needed for executing the application. The processor-executable instructions, on execution, further cause the processor to create at least one memory pool, based on the memory requirements, by aggregating physical memories of the plurality of devices. The processor-executable instructions, on execution, further cause the processor to execute the application in the at least one memory pool using semaphores and a mutex application programming interface (API).

Certain embodiments of this technology relates to a method for performing memory management comprises obtaining memory requirements for execution of an application. The memory requirements indicate memory space needed for executing the application. Further, the method comprises creating at least one memory pool, based on the memory requirements, by aggregating physical memories of the plurality of devices. Further, the method comprises executing the application in the at least one memory pool using semaphores and a mutex application programming interface (API).

Certain embodiments of this technology also relate to a non-transitory, computer-readable medium storing instructions that, when executed by a processor, cause the processor to perform operations comprising obtaining memory requirements for execution of an application. The memory requirements indicate memory space needed for executing the application. Further, the operations comprise creating at least one memory pool, based on the memory requirements, by aggregating physical memories of the plurality of devices. Further, the operations comprise executing the application in the at least one memory pool using semaphores and a mutex application programming interface (API).

Additional objects and advantages of this technology will be set forth in part in the following detailed description, and in part will be obvious from the description, or may be learned by practice of this technology. The objects and advantages of this technology may be realized and attained as set forth in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
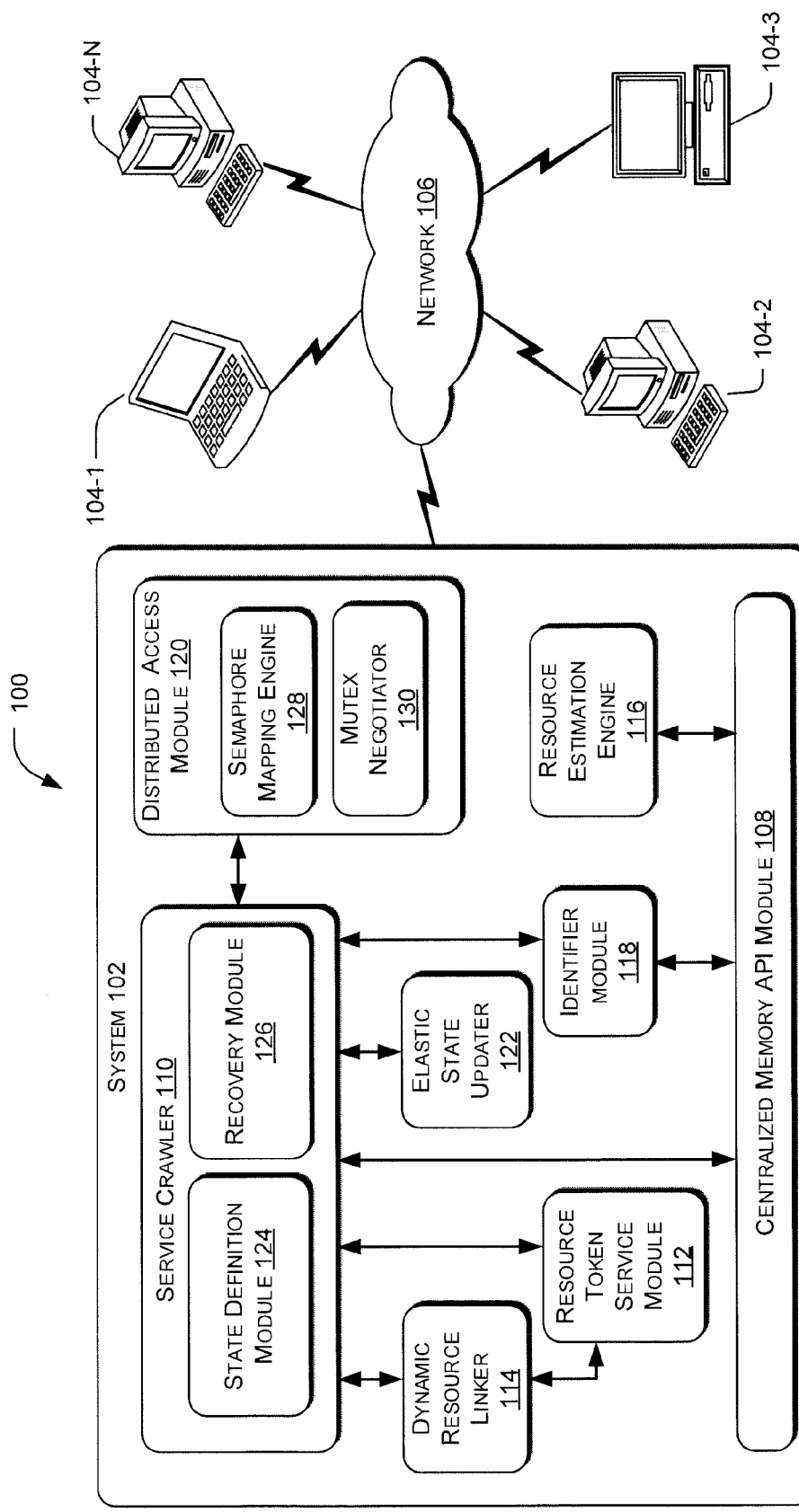
FIG. 1 illustrates a network environment incorporating a system for performing memory management among a plurality of devices in a network, according to some embodiments of this technology.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Conventionally, multiple servers or systems interconnected to each other are used to store and process huge amount of data generated through various data sources. Typically, in such situation, a single task or operation is split into multiple sub-tasks and these sub-tasks are distributed across the systems for execution. In such cases, since the sub-tasks are distributed across systems, memory size of a sub-task that can be executed by the system is limited by physical memory of the system executing that particular sub-task.

The present subject matter discloses systems and methods for performing memory management among a plurality of devices in a network. The systems and methods may be implemented in a variety of computing systems. The computing systems that can implement the described method(s) include, but are not limited to, a server, a desktop personal computer, a notebook or a portable computer, and a mainframe computer. Although the description herein is with reference to certain computing systems, the systems and methods may be implemented in other computing systems, albeit with a few variations, as will be understood by a person skilled in the art.

In operations, when an application comes for an execution in a network with multiple servers or devices, a system of the present subject matter, configured in at least one of the multiple servers, may establish a connection with the application. In an example, the system may establish the connection with the application after authenticating the application based on credentials received from the application. In an example, the connection may be established via local network Sockets, Representational State Transfer (REST) Application Programming Interfaces (APIs) and Remote Procedural Calls (RPC).

Once the connection is established, the system may obtain memory requirements for execution of the application. The memory requirements may comprise details indicating memory space needed for execution of the application. Thereafter, the system may determine size of memory pools to be created based on the memory requirements received from the application. Upon determining the system may create at least one memory pool by aggregating physical memories of the servers or devices available in the network. In this manner, a centralized pool of memory resources is created having the at least one memory pool. Further, the at least one memory pool is assigned a unique identifier (ID) which may be used in defining access policies for the memory pools.

Then the system may load data, needed by the application, to the memory pools. In an example, the data may be loaded in parallel across all the devices as the physical memory in all the devices is linked using a dynamic resource linker 114 which distributes and parallelize data loading operation. Hereinafter, the data loaded to memory pools may also be referred to as application data.

The system, of the present subject matter, may then configure access policies for distributed access of the application data. In an example, the access policies may define various rules for accessing a dataset or files in a memory pool to avoid corruption by simultaneously allowing read and write operations. In another example, the access policies may define an exclusive access to the data set where one process can access the data set at a time. Further, the access policies may be distributed among all the devices using semaphores and mutex API Mapping to make all the system aware of the policies which protects the data from corruption.

Subsequently, the application is executed in the at least one memory pools using the semaphores and the mutex API. Further, the system may monitor the execution to track execution status of the application. Once the execution is complete, the memory pools may be released for further allocation. In another example, the memory pools may be dissolved in the centralized pool of memory resources after a predefined time defined by the application. An application can reuse a released memory pool within the predefined configured time for deletion.

Further, the system provides a recovery mechanism to rectifying errors arising in the memory pools for fault tolerant and unattended access. In case of a device failure, a series of recovery steps may be performed. For failure recovery, the system may monitor state definitions of each of the devices and may update a state snapshot upon detecting a change in the state definition. The state snapshot may comprise the execution status and a current state of the plurality of devices. The system may keep the state snapshot with updated memory resource details redundantly across system. Thereafter, based on the state snapshot, the system may perform the recovery operations.

Thus, examples of this technology improve the functioning of a computing apparatus to allow an application or a task to leverage total memory available across multiple systems interconnected to each other through a network. Examples of this technology aggregate physical memories spread across the multiple systems and created a centralized pool of memory. Therefore, even data-extensive application can also be executed irrespective of size of physical memory of a system. Further, examples of this technology provide a recovery mechanism to rectify errors arising in execution and handle unattended access.

Working of the apparatuses and methods for generating the secure locking interface is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 incorporating a system or apparatus 102 for performing memory management among a plurality of devices 104 in a network 106, according to some embodiments of this technology.

The system 102 may be implemented in a variety of computing apparatuses, such as a laptop computer, a desktop computer, a notebook, a workstation, a mainframe computer, a server, a network server, and the like. Further, as shown in FIG. 1, the plurality of devices 104-1, 104-2, 104-3, 104-N are communicatively coupled to each other and to the system 102 through the network 106 for facilitating one or more end users to access and/or operate the system 102.

Further, the system 102 may aggregate physical memory of the plurality of devices 104-1, 104-2, 104-3, 104-N, collectively referred to as devices 104 and individually referred to as device 104, to create a centralized pool of memory resources. Examples of the devices 104 include, but are not limited to, a desktop computer, a portable computer, a server, a handheld device, and a workstation. The devices 104 may be used by various stakeholders or end users, such as system administrators and application developers. In one implementation, the system 102 may be configured in at least one of the device 104 to aggregate the memory of the plurality of devices 104.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

The system 102 may include a processor (not shown in FIG. 1), a memory (not shown in FIG. 1) coupled to the processor, and interfaces (not shown in FIG. 1). The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory. The memory can include any non-transitory computer-readable medium known in the art including, for example, volatile memory (e.g., RAM), and/or non-volatile memory (e.g., EPROM, flash memory, etc.).

The interface(s) may include a variety of software and hardware interfaces, for example, a web interface, a graphical user interface, etc., allowing the system 102 to interact with the devices 104. Further, the interface(s) may enable the system 102 respectively to communicate with other computing devices. The interface(s) can facilitate multiple communications within a wide variety of networks and protocol types, including wired networks, for example LAN, cable, etc., and wireless networks such as WLAN, cellular, or satellite. The interface(s) may include one or more ports for connecting a number of devices to each other or to another server.

As shown in FIG. 1, the system 102 includes various modules, such as a centralized memory API module 108, a service crawler 110, a resource token service module 112, a dynamic resource linker 114, a resource estimation engine 116, an identifier module 118, a distributed access module 120, and an elastic state updater 122. It will be appreciated that such aforementioned modules may be represented as a single module or a combination of different modules. In one embodiment, the modules may be stored within the memory. In one example, the modules, amongst other things, include routines, programs, objects, components, and data structures, which perform particular tasks or implement particular abstract data types. The modules and may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

In operation, when physical memory of the device 104 is not able to meet memory requirements of an application or task received for execution or a request for aggregation of physical memory of the plurality of devices 104 is received, the centralized memory API module 108 establishes a connection between the application and the system 102. The centralized memory API module 108, hereinafter also referred to as memory module 108, may receive user instructions for performing various operations. The various operations may comprise: creating/dissolving new memory pool with space less than or equal to the overall size of centralized pool of memory resources, defining unique ID, overriding existing/default resource token parameters, adding new customized rules for failure recovery, creating new users of memory pool, Load, append, update and deletion of data loaded in memory pool, configuring access policies for each memory pool created at file and user level, and track application execution and memory usages details.

Once the memory module 108 establishes the connection with the application, the service crawler 110 may select the devices 104 that are available in the network 106 for aggregation of their physical memories so that a centralized memory pool can be created for the execution of the application. In an example, a user may provide his input for selecting some devices 104 from amongst the plurality of devices 104 to be used for memory aggregation. The user may provide the input to the service crawler 110 through the centralized memory API module 108. The service crawler 110 interacts with various modules of the system 102 and is also responsible for informing a user about system details and the devices 106 which should be part of memory aggregation.

As shown in FIG. 1, the service crawler 110 comprises state definition module 124 and a recovery module 126. The state definition module 124 manages state definitions for each of the plurality of devices 104. The state definitions may include various details, such as the devices 104 that are part of the centralized pool of memory resources, amount of memory each of the devices 104 is sharing, and health of each of the devices and health of each of the devices 104. In case one of the devices 104 crashes and become unavailable, the state definitions present redundantly in other devices 104 in the network 106 are updated to reflect the change. In an example, the state definition module 124 continuously checks a state of each of the plurality of devices 104 which are part of the memory aggregation and keeps a track of overall status redundantly across the devices 104 using the elastic state updater 122. The recovery module 126 is responsible for carrying out recovery operations in case of any error arising in executing the application. The recovery module 126 is discussed in more details along with the elastic state updater 122.

Further, once the plurality of devices 104, which are available for creating a centralized pool of memory resources, are determined, the service crawler 110 may configure the resource token service module 112 in each of the plurality of devices 104. In an example, if a new device added in the network 106 for memory aggregation, the service crawler 110 may install the resource token service module 112 in the new device.

The resource token service module 112 exposes memory resources available in the device 104 in which it is running. Thus, the exposed memory resource of the device 104 becomes available for becoming part of the centralized pool of memory resources.

Thereafter, the dynamic resource linker 114 may link all the memory resources exposed by the resource token service module 112 running in each of the plurality of devices 104. After linking all the memory resources, the resource token service module 112 makes the aggregated memory resources available as the centralized pool of unified resources, specifically memory. In an example, the resource token service module 112 may continuously send resource information to the service crawler 110 for state maintenance.

Further, when the connection between the system 102 and the application is established, the memory module 108 may receive memory requirements from the application for execution. The memory requirements may indication size of memory space needed for executing the application. The resource estimation engine 116 may determine size of memory pools to be created for execution of the application based on the memory requirements. In an example, the resource estimation engine 116 may dynamically adjust resources available to all the memory pools running in the centralized memory pool for efficient use of all the available memory space.

The identifier module 118 may then assign a unique ID to the each of memory pool created in the centralized pool of memory resources spread across the plurality of devices 104. The use of the unique ID may enable more than one application to use the centralized pool of memory resources depending upon requirements.

Thereafter, the memory module 108 may load application data to the memory pools for execution of the application. As the name suggest, the application data is data needed by the application for execution. The application depends on the type of memory intensive application to be executed in the system. In an example, for an application related to social media analytics data, the application data may include information posted on various social media sites, such as posts, status updates, and user details. In another example, for an application related to log analytics, the application data may include logs generated by web servers, routers, etc. Once the application data is loaded, the distributed access module 120 may define access policies for accessing the application data present in the memory pools.

As shown in FIG. 1, the distributed access module 120 comprises a semaphore mapping engine 128 and a mutex negotiator 130. The semaphore mapping engine 128 manages access of data efficiently without corruption in a distributed manner. In an example, a semaphore may be associated with each file of the memory pools present in the centralized pool of memory resources. When a memory pool is to be used by the application, the application may acquire the semaphore and decrement a status value of the semaphore. Once the execution is over, the application may release the semaphore and increment the status value of the semaphore.

Since all the memory resources are logically connected to each other, access is not according to the number of devices 104 participating in the centralized memory system, instead it's per file based access. This makes it possible for various application developers to develop memory intensive applications which require distributed access and writing of data, such as real-time databases and high volume messaging queues. The data is stored in serialized objects over the memory pool at file level. The number of simultaneous access restriction is on serialized objects created at file level. Thus a file level concurrent access is provided to the application.

Further, in situations where the data is to be accessed by various threads of an application at the same time, the mutex negotiator 130 may maintain distributed mutual exclusions for each thread per file which is expected to be read or written by multiple threads across the devices 104 for proper handling of data distribution and avoid corruption of data. In an example, when an application wants to acquire a lock and both semaphore and mutex are available, the distributed access module 120 creates a semaphore lock on the data that the application wants to access. The mutex negotiator 130 and semaphore mapping engine 128 eliminate chances of getting data corrupt and accessed by different threads of the application. In case, the semaphore and mutex API are not available, the execution of the application may wait till any of the semaphore and the mutex is free. In this manner, the application is executed in the memory pools based on the semaphores and the mutex API. Once the execution of the application is complete, the memory module 108 may release the memory pools so that it can be allocated to other application. In an example, the memory pools may remain available to the application for a predefined time after the execution. After completion of the predefined time, the memory pool allocated to the application may be released.

During the execution, the recovery module 126 may maintain state definitions of each of the plurality of devices 104 so that a failure recovery may be performed in case of any error in execution. In an example, when a state definition of a particular resource is changed or lost, the elastic state updater 122 is notified for updating a state snapshot of all the devices 104, for which aggregation of memory has been performed, after a series of resource recovery steps. The recovery module 126 may perform the resource recovery. In an example, to recover any lost resource, the recovery module 126 may request a restart of resource token and then attempt a lower value of exposed memory resources in the resource token configuration. Then the recovery module 126 may restart the token services and request a device restart and wait for the resource to be available again. Further, the recovery module 126 may decommission the devices 104 and try to commission them as a part of the centralized pool of resources again after configured wait time.

To perform the failure recovery, the elastic state updater 122 may create an overall state snapshot of the system 102 and keeps it redundantly across the plurality of devices 104. In case of a device failure, after the series of recovery steps performed by the recovery module 126, the state definition updates are given to the elastic state updater 122. The elastic state updater 122 may then create a state snapshot with updated memory resource details and distribute redundantly across the devices 102. The same action may be repeated on addition of new devices to the system 102. In an example, the addition of a new device may be performed instantly as all the resources are linked by the dynamic resource linker 114 and a new device can be added in sub seconds and its state is updated across the devices 104.

Thus, the present subject matter provides a centralized memory pool spread across multiple devices 104 or servers which may be designed for computing applications to leverage distributed resources without data corruption. Also, the present subject matter uses distributed semaphores to correctly access a resource by limiting the number of concurrent access where the actual resource is spread across multiple devices 104.

Figure 2:
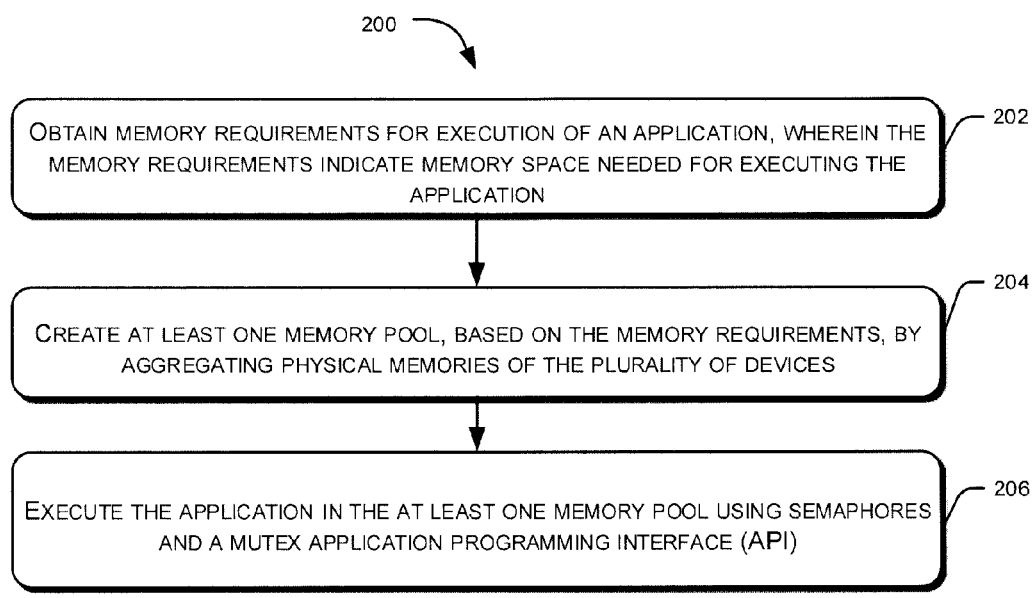
FIGS. 2 and 3 illustrate exemplary computer implemented methods for performing memory management among a plurality of devices in a network, according to some embodiments of this technology.
Figure 3:
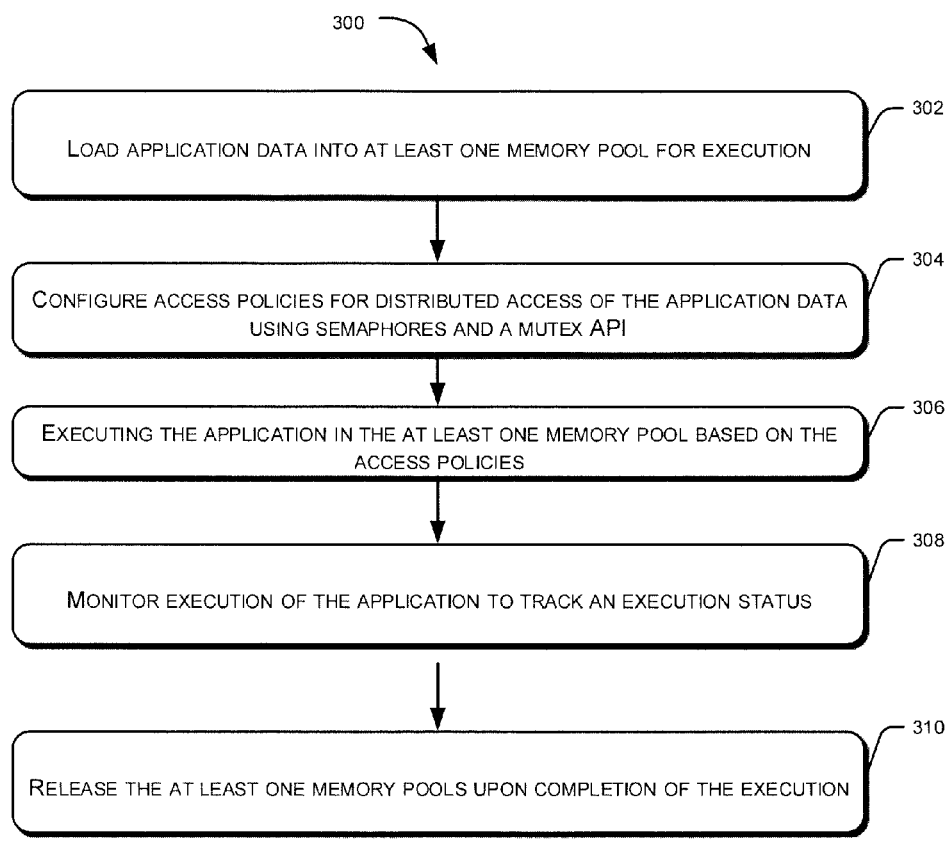

FIGS. 2 and 3 illustrate exemplary computer implemented methods for performing memory management among a plurality of devices 104 in a network 106, according to some embodiments of this technology.

The methods 200 and 300 may be described in the general context of computer executable instructions. Generally, computer executable instructions can include routines, programs, objects, components, data structures, procedures, modules, and functions, which perform particular functions or implement particular abstract data types. The methods 200 and 300 may also be practiced in a distributed computing environment where functions are performed by remote processing devices 104 that are linked through a communication network 106. In a distributed computing environment, computer executable instructions may be located in both local and remote computer storage media, including memory storage devices.

The order in which the methods 200 and 300 are described is not intended to be construed as a limitation, and any number of the described method steps can be combined in any order to implement the methods 200 and 300 or alternative methods. Additionally, individual steps may be deleted from the methods 200 and 300 without departing from the spirit and scope of the subject matter described herein. Furthermore, the methods 200 and 300 can be implemented in any suitable hardware, software, firmware, or combination thereof.

With reference to method 200 as depicted in FIG. 2, as shown in step 202, memory requirements for execution of an application are obtained. In an example, the memory requirements may indicate memory space needed for executing the application. In one implementation, the memory module 108 may establish a connection with the application and receive the memory requirements for the application.

At step 204, at least one memory pool is creating, based on the memory requirements, by aggregating physical memories of the plurality of devices 104 present in the network 106. In one implementation, the service crawler 110 may install the token service module 112 in each of the devices 104 that are available for aggregation of physical memory. The token service module 112 exposes the physical memory of each of the devices 104 for aggregation. Then, the dynamic resource linker 114 may aggregate all the physical memories that are exposed to create a centralized pool of memory resources. Thereafter, the resource estimation engine 116 may determine size of the memory pools to be created in the centralized pool of memory resources based on the memory requirements. Once the size of the memory pools is determined, the memory pools may be created and each of the memory pools may be assigned a unique ID generated by the identifier module 118.

At step 206, the application is executed in the at least one memory pool using semaphores and a mutex application programming interface (API). In one implementation, the application waits for a semaphore and a mutex. Once the semaphore and the mutex are available, the application may acquire the semaphore and the mutex to access the application data loaded to the memory pools. Upon completion of the operations on the application data, the semaphore and the mutex may be released. The execution of the application is discussed in more details in conjunction with FIG. 3.

With reference to method 300 as depicted in FIG. 3, at step 302, the application data is loaded into the at least one memory pool for execution. In one implementation, the memory module 108 loads the application data into the memory pools. The application data may be understood as data needed by the application during execution.

At step 304, access policies for distributed access of the application data are configured using the semaphores and the mutex API. In one implementation, the semaphore mapping engine 128 may manage access of data efficiently without corruption in a distributed manner by defining these access policies. Further, the mutex negotiator 130 may define access policies to maintain distributed mutual exclusions for each thread per file which is expected to be read or written by multiple threads across devices 104 part of the memory aggregation.

At step 306, the application is executed in the at least one memory pool based on the access policies. In one implementation, based on the access policies defined by the semaphore mapping engine 128 and the mutex negotiator 130, the application is executed in the at least one memory pool.

At step 308, execution of the application is monitored to track an execution status. In one implementation, the recovery module 126 may keep a track on the execution of the application to determine the execution status. In an example, the execution status may indicate percentage completion of the execution. In another example, the execution status may indicate a successful, failure or pending message. In one implementation, for performing failure recovery, the state definitions module may monitor state definitions of each the plurality of devices 104. Thereafter, the elastic state updater 122 may update a state snapshot upon detecting a change in the state definition. The state snapshot may comprise the execution status and a current state of the plurality of devices 104. Subsequently, the recovery module 126 may perform a recovery based on a state snapshot comprising an execution status and the current state of the plurality of devices 104.

At step 310, the at least one memory pools are released upon completion of the execution. In one implementation, the memory pools may remain available to the application for allocation till a predefined time. In an example, the predefined time may be defined by a user through the memory module 108. Once the predefined time expires, the memory pool may be dissolved into the centralized pool of memory resources. In an example, the memory pools may be released as soon as the execution of the application is completed.

Computer System

Figure 4:
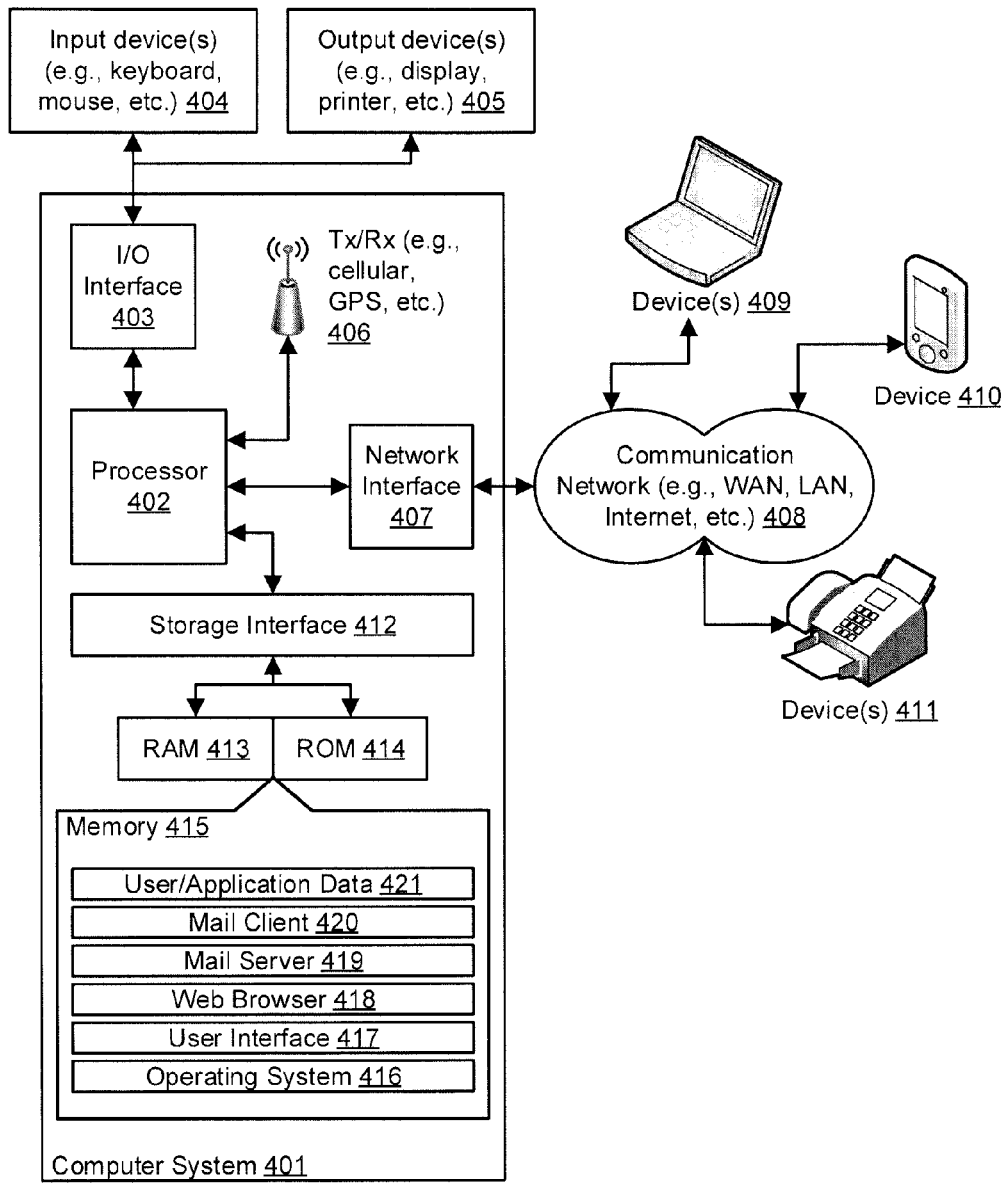
FIG. 4 is a block diagram of an exemplary computer system for implementing embodiments consistent with this technology.

FIG. 4 is a block diagram of an exemplary memory management computer apparatus or system that implements embodiments of this technology as illustrated and described with the examples herein. Variations of the computer apparatus or system 401 may be used for implementing any of the devices presented in this disclosure. Computer apparatus or system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 318-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer apparatus or system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer apparatus or system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described methods and apparatuses that perform memory management among a plurality of devices in a network. The examples of the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more non-transitory computer-readable storage media may be utilized in implementing embodiments consistent with this technology. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages of the technology as illustrated and described in the examples herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing memory management among a plurality of devices in a network, the method comprising:
    obtaining, by a processor, memory requirements for execution of an application, wherein the memory requirements indicate memory space needed for executing the application;
    creating, by the processor, at least one memory pool, based on the memory requirements, by aggregating physical memories of the plurality of devices; and
    executing, by the processor, the application in the at least one memory pool using semaphores and a mutex application programming interface (API).

2. The method of claim 1, wherein the executing further comprising:
    loading application data into the at least one memory pool for execution;
    configuring, by the processor, access policies for distributed access of the application data using the semaphores and the mutex API;
    executing, by the processor, the application in the at least one memory pool based on the access policies;
    monitoring, by the processor, execution of the application to track an execution status; and
    releasing, by the processor, the at least one memory pools upon completion of the execution.

3. The method of claim 1 further comprises assigning, by the processor, a unique identifier (ID) to each of the at least one memory pool.

4. The method of claim 1 further comprises:
    monitoring, by the processor, state definitions of each the plurality of devices; and
    updating, by the processor, a state snapshot upon detecting a change in the state definitions, wherein the state snapshot comprises an execution status and a current state of the plurality of devices.

5. The method of claim 1 further comprises performing, by the processor, a recovery based on a state snapshot comprising an execution status and a current state of the plurality of devices.

6. A memory management computing apparatus comprising:
    one or more hardware processors; and
    a memory storing instructions that, when executed by the one or more hardware processors, cause the one or more hardware processors to perform operations comprising:
        obtaining memory requirements for execution of an application, wherein the memory requirements indicate memory space needed for executing the application;
        creating at least one memory pool, based on the memory requirements, by aggregating physical memories of the plurality of devices; and
        executing the application in the at least one memory pool using semaphores and a mutex application programming interface (API).

7. The apparatus according to claim 6, wherein the instructions, on execution, further cause the one or more hardware processors to perform operations comprising:
    loading application data into the at least one memory pool for execution;
    configuring access policies for distributed access of the application data using the semaphores and the mutex API;
    executing the application in the at least one memory pool based on the access policies;
    monitoring execution of the application to track an execution status; and
    releasing the at least one memory pools upon completion of the execution.

8. The apparatus according to claim 6, wherein the instructions, on execution, further cause the processor to perform operations comprise assigning a unique identifier (ID) to each of the at least one memory pool.

9. The apparatus according to claim 6, wherein the instructions, on execution, further cause the processor to perform operations comprise:
    monitoring state definitions of each the plurality of devices; and
    updating a state snapshot upon detecting a change in the state definitions, wherein the state snapshot comprises an execution status and a current state of the plurality of devices.

10. The apparatus according to claim 6, wherein the instructions, on execution, further cause the processor to perform operation comprising performing a recovery based on a state snapshot comprising an execution status and a current state of the plurality of devices.

11. A non-transitory computer-readable medium storing instructions for performing memory management among a plurality of devices in a network, wherein upon execution of the instructions by one or more hardware processors, the hardware processors perform operations comprising:
    obtaining memory requirements for execution of an application, wherein the memory requirements indicate memory space needed for executing the application;
    creating at least one memory pool, based on the memory requirements, by aggregating physical memories of the plurality of devices; and
    executing the application in the at least one memory pool using semaphores and a mutex application programming interface (API).

12. The non-transitory computer-readable medium according to claim 11, wherein the operations further comprise:
    loading application data into the at least one memory pool for execution;
    configuring access policies for distributed access of the application data using the semaphores and the mutex API;

executing the application in the at least one memory pool based on the access policies;

monitoring execution of the application to track an execution status; and releasing the at least one memory pools upon completion of the execution.

13. The non-transitory computer-readable medium according to claim 11, wherein the operations further comprise assigning a unique identifier (ID) to each of the at least one memory pool.

14. The non-transitory computer-readable medium according to claim 11, wherein the operations further comprise:

monitoring state definitions of each the plurality of devices; and updating a state snapshot upon detecting a change in the state definitions, wherein the state snapshot comprises an execution status and a current state of the plurality of devices.

15. The non-transitory computer-readable medium according to claim 11, wherein the operations further comprise performing a recovery based on a state snapshot comprising an execution status and a current state of the plurality of devices.

* * * * *